United States Patent
Tsai

[19]

[11] Patent Number: 5,822,087
[45] Date of Patent: Oct. 13, 1998

[54] APPARATUS HAVING A ROTATABLE ARM FOR PROVIDING LIGHT SOURCE FOR A TRANSPARENT SHEET AND A REFLECTIVE SHEET

[75] Inventor: Jenn-Tsair Tsai, Hsinchu, Taiwan

[73] Assignee: Mustek Systems, Inc., Hsinchu, Taiwan

[21] Appl. No.: 728,226

[22] Filed: Oct. 10, 1996

[51] Int. Cl.6 .................................................. H04N 1/04
[52] U.S. Cl. ......................... 358/475; 358/474; 358/487; 358/497
[58] Field of Search ..................................... 358/475, 474, 358/471, 487, 509, 505, 506, 497, 496, 498, 494, 409; 250/234, 235

[56] References Cited

U.S. PATENT DOCUMENTS

| | | | |
|---|---|---|---|
| 4,422,100 | 12/1983 | DuVall et al. | 358/497 |
| 4,870,294 | 9/1989 | Hasegawa | 358/494 |
| 4,959,737 | 9/1990 | Nakatani | 358/474 |
| 5,432,622 | 7/1995 | Johnston et al. | 358/474 |
| 5,673,125 | 9/1997 | Merecki et al. | 358/475 |

Primary Examiner—Edward L. Coles
Assistant Examiner—Cheukfan Lee
Attorney, Agent, or Firm—McDermott, Will & Emery

[57] ABSTRACT

The invention disclosed a rotatable lamp carriage for a scanner which can provide light source for a reflective sheet or a transparent sheet using only a single lamp. The invention mainly includes a lamp carriage, a base carriage, a rotatable arm, a support arm, and a driving device. The lamp carriage and the base carriage are connected together by the rotatable arm and the support arm. The rotatable arm which consists of a gear set controls the movement of the lamp carriage. When the rotatable arm is driven upwards, the lamp carriage provides light source for a transparent sheet. When the rotatable arm is driven downwards, the lamp carriage provides light source for a reflective sheet.

10 Claims, 5 Drawing Sheets

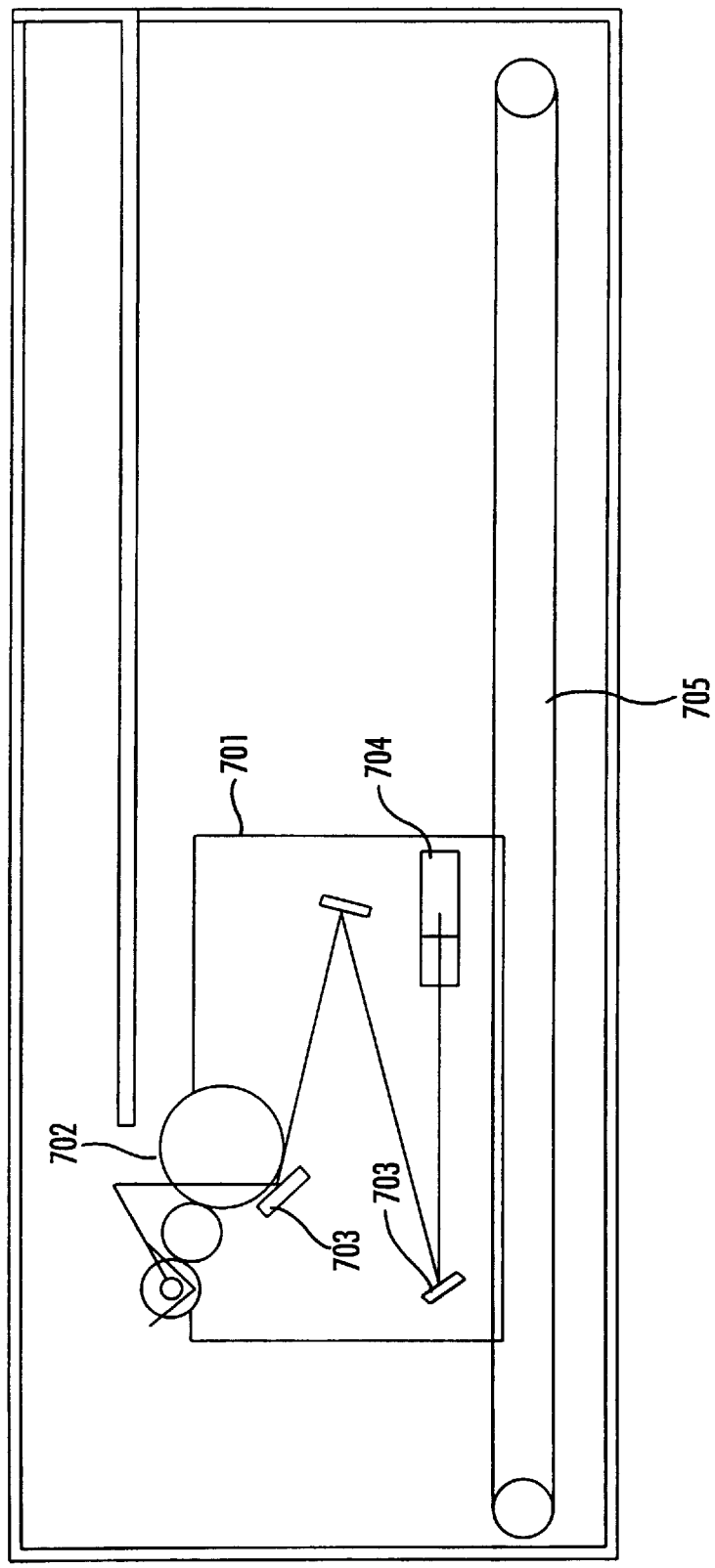

APPARATUS HAVING A ROTATABLE ARM FOR PROVIDING LIGHT SOURCE FOR A TRANSPARENT SHEET AND A REFLECTIVE SHEET

BACKGROUND OF THE INVENTION

A. Field of the Invention

The invention relates to a lamp carriage for a scanner, especially to a rotatable lamp carriage for a photo drive for providing light source for a transparent sheet and a reflective sheet.

B. Description of the Prior Art

A conventional scanner which has the functions of scanning a transparent sheet and a reflective sheet usually requires two lamps: one on the top and the other at the bottom. When scanning a reflective sheet, the light source comes from the lower lamp. When scanning a transparent sheet, the light source comes from the upper lamp. The light rays shone on an original sheet are reflected to a CCD or CIS line image sensor via an array of mirrors. The typical structure of the scanner has several disadvantages. First, it requires two driving mechanisms for the lamps. Therefore, its structure is more complicated and its cost is higher. Second, since these two lamp carriages do not work at the same time, it will need more warm-up time if reflective sheets and transparent sheets are scanned interchangeably. Third, two lamp carriages certainly occupy more space than one. It is difficult to adopt this structure in a small size scanner like a photo drive.

SUMMARY OF THE INVENTION

It is therefore the object of the invention to provide a simple-structure, easy-to-adopt lamp carriage for providing light source for transparent sheets and reflective sheets using only one lamp.

It is another object of the invention to provide a double-function lamp carriage loaded with a single lamp so as to save the lamps, the space, the cost, and the warm-up time.

It is still another object of the invention to provide a lamp carriage which is small in size and easy to be installed in a photo drive.

These and other objects of the invention, which will become more apparent as the invention is described more fully below, are obtained by providing a lamp carriage which has a rotatable arm and a single lamp for providing light source for both a transparent sheet and a reflective sheet. The invention mainly encompasses a lamp carriage, a base carriage, a rotatable arm, a support arm, and a driving device. The lamp carriage and the base carriage are connected together by the rotatable arm and the support arm. The rotatable arm which consists of a gear set controls the movement of the lamp carriage. When the rotatable arm is driven upwards, the lamp carriage provides light source for a transparent sheet. When the rotatable arm is driven downwards, the lamp carriage provides light source for a reflective sheet.

BRIEF DESCRIPTION OF THE DRAWINGS

FIG. 4 is a sectional schematic view showing the invention is coupled to a conventional scanner.

DETAILED DESCRIPTION OF THE PREFERRED EMBODIMENTS

Figure 1B:
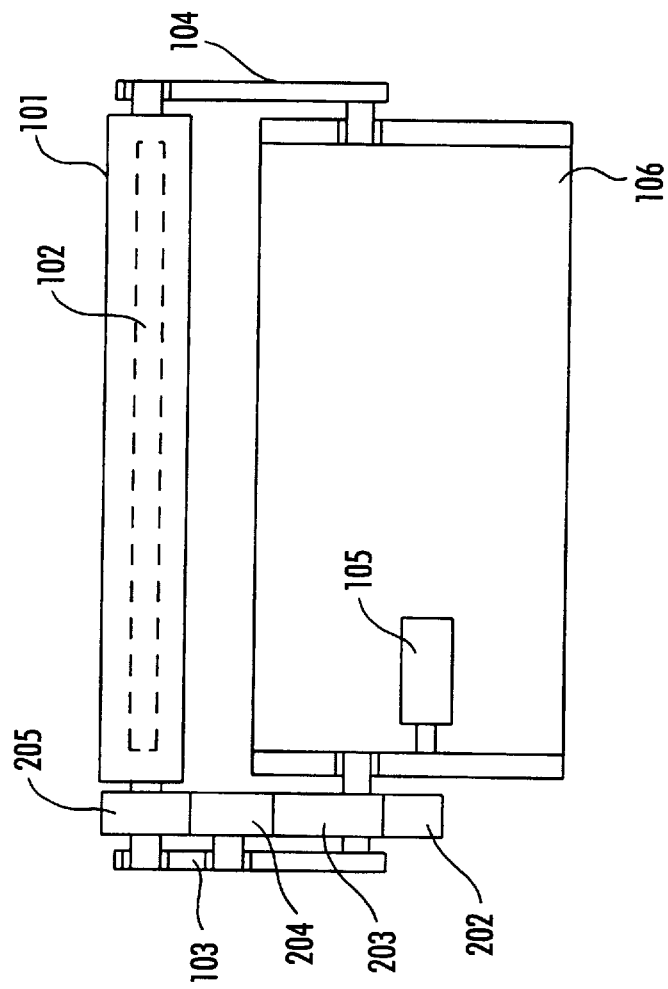
FIG. 1B is a sectional schematic view showing the side-view of the preferred embodiment of the present invention.
Figure 1A:
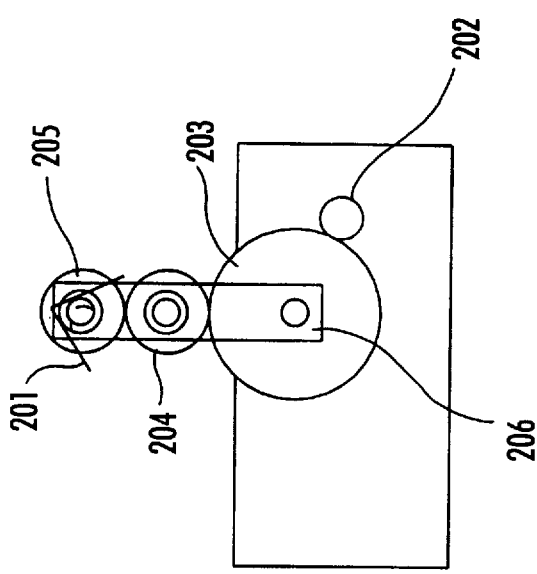
FIG. 1A is a sectional schematic view showing the front view of the preferred embodiment of the present invention.

The present invention will be clarified in detail by reference to the preferred embodiments. FIG. 1A shows the front view of the preferred embodiment of the invention. Refer to FIG. 1A, the invention only uses a single lamp 102 which is installed on lamp carriage 101. Refer also to FIG. 1B for the side-view of the invention, a mirror 201 is installed closed to the lamp 102. When the lamp carriage 101 is rotated upwards, the mirror 201 will face downwards so as to reflect the light beams downwards. When the lamp carriage 101 is rotated downwards, the mirror will face upwards so as to reflect the light beams upwards.

The lamp carriage 101 is connected to base carriage 106 via a rotatable arm 103 and a support arm 104. The rotatable arm 103 controls the movement of the lamp carriage 101. The support arm 104 supports the lamp carriage 101 while moving. Refer to FIG. 1B, the rotatable arm 103 consists of a gear set which includes master gear 202, carriage gear 203, idle gear 204, and holder gear 205. These gears are connected to one another by a linkage plate 206. The driving power of the rotatable arm 103 comes from the motor 105 inside the base carriage 106.

As FIG. 1B illustrates, the radius of each gear is designed in different sizes so that the rotation of each gear will result in the movement of the rotatable arm from bottom to the top and vice versa. When master gear 202 rotates in clockwise direction, carriage gear 203 is driven to move in counter-clockwise direction. The idle gear 204 is driven to rotate in clockwise direction while the holder gear 205 in counter-clockwise direction. Since the holder gear 205 is mounted on the lamp carriage 101, the rotation of the holder gear 205 will also move the lamp carriage 101. Consequently, the rotation of the gear set will move the lamp carriage 101 right above the original sheet. When the lamp carriage 101 is moving upwards, the mirror 201 is facing downwards so as to reflect light beams on a transparent sheet. At this time, the idle gear 204 readily forms a space between the lamp carriage 101 and the base carriage 106 for the original sheet on the document tray (not shown) to slip through.

In contrast, when scanning a reflective sheet, master gear 202 rotates in counterclockwise direction while carriage gear 203 in clockwise direction. The idle gear 204 is then rotated in counterclockwise direction while the holder gear 205 in clockwise direction. Consequently, the lamp carriage 101 is moving to the bottom of the document tray (not shown). The mirror 201 will then face upwards so as to reflect light beams on the reflective sheet. Due to the rotation of the lamp carriage 101, the invention can provide light source for both the reflective sheet and the transparent sheet using only a single lamp.

Figure 2A:
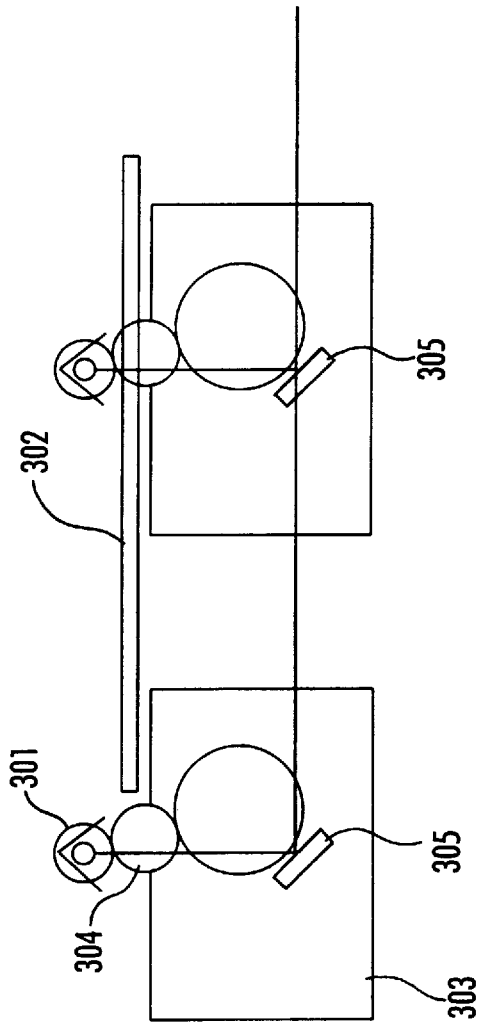
FIG. 2A is a sectional schematic view showing the state when the invention is providing light source for a transparent sheet.

To show how the invention operates when scanning a transparent sheet, refer to FIG. 2A. Place a transparent sheet on the transparent document tray 302 which is made of glass or PC. When scanning, lamp carriage 301 is on top of the document tray 302. As the base carriage 303 is moving linearly towards the transparent document tray 302, it will let the transparent document tray 302 pass through the space formed by the idle gear 304. The image information of the transparent sheet on the document tray 302 is then guided to the photoelectric converting unit (not shown) via an array of mirrors 305. The photoelectric converting unit can be implemented as a CCD line image sensor or a CIS line image sensor. The photoelectric converting unit will then convert the image information into digital signals.

Figure 2B:
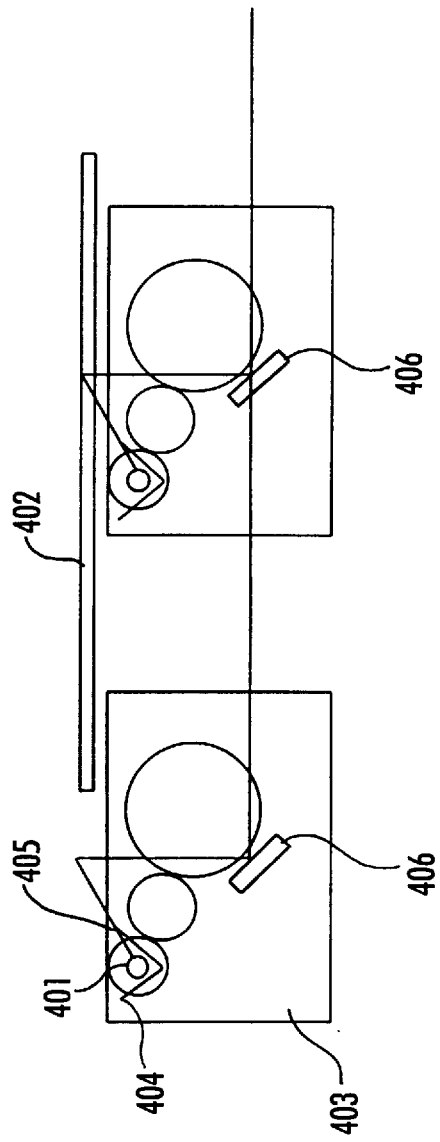
FIG. 2B is a sectional schematic view showing the state when the invention is providing light source for a reflective sheet.

Refer to FIG. 2B, when scanning a reflective sheet, the lamp carriage 401 moves to the bottom of the document tray 402. When the base carriage 403 is moving linearly towards the transparent document tray 402, the document tray 402 will pass through the top of the base carriage 403. Meanwhile, the mirror 404 is moving underneath the lamp 405 and facing upwards so as to reflect light beams towards the document tray 402. The exposure of the reflective sheet is then completed when each portion of the reflective image is sent to the photoelectric converting unit (not shown) via an array of mirrors 406.

Figure 3A:
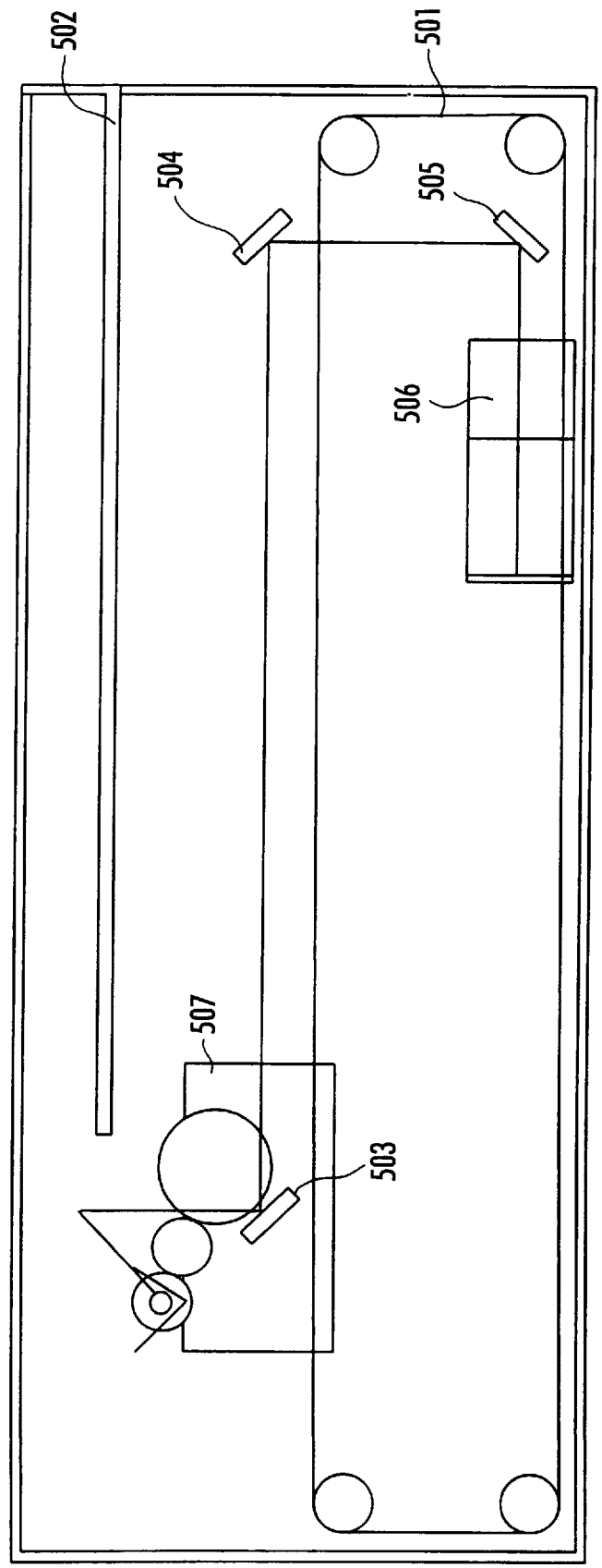
FIG. 3A is a sectional schematic view showing the invention is providing light source for a transparent sheet when the invention is coupled to a photo drive.

The structure of the invention is so simple that it can be easily adapted to a photo drive. Refer to FIG. 3A, it shows the structure of a photo drive with the implementation of the rotatable lamp carriage when scanning a reflective sheet. As FIG. 3A shows, the rotatable lamp carriage 507 is mounted on a closed-loop conveying device 501 which moves the rotatable lamp carriage 507 and the photoelectric converting unit 506 synchronously and in opposite directions. An original sheet 502 is placed on transparent document tray 502 which is made of glass or PC. When scanning, conveying device 501 moves the rotatable lamp carriage 507 towards the document. The lamp of the rotatable lamp carriage 507 rotates underneath the transparent document tray 502 so as to emit light beams upwards. The image information of the reflective sheet is then guided to the photoelectric converting device 506 via an array of mirrors 503, 504, and 505.

Figure 3B:
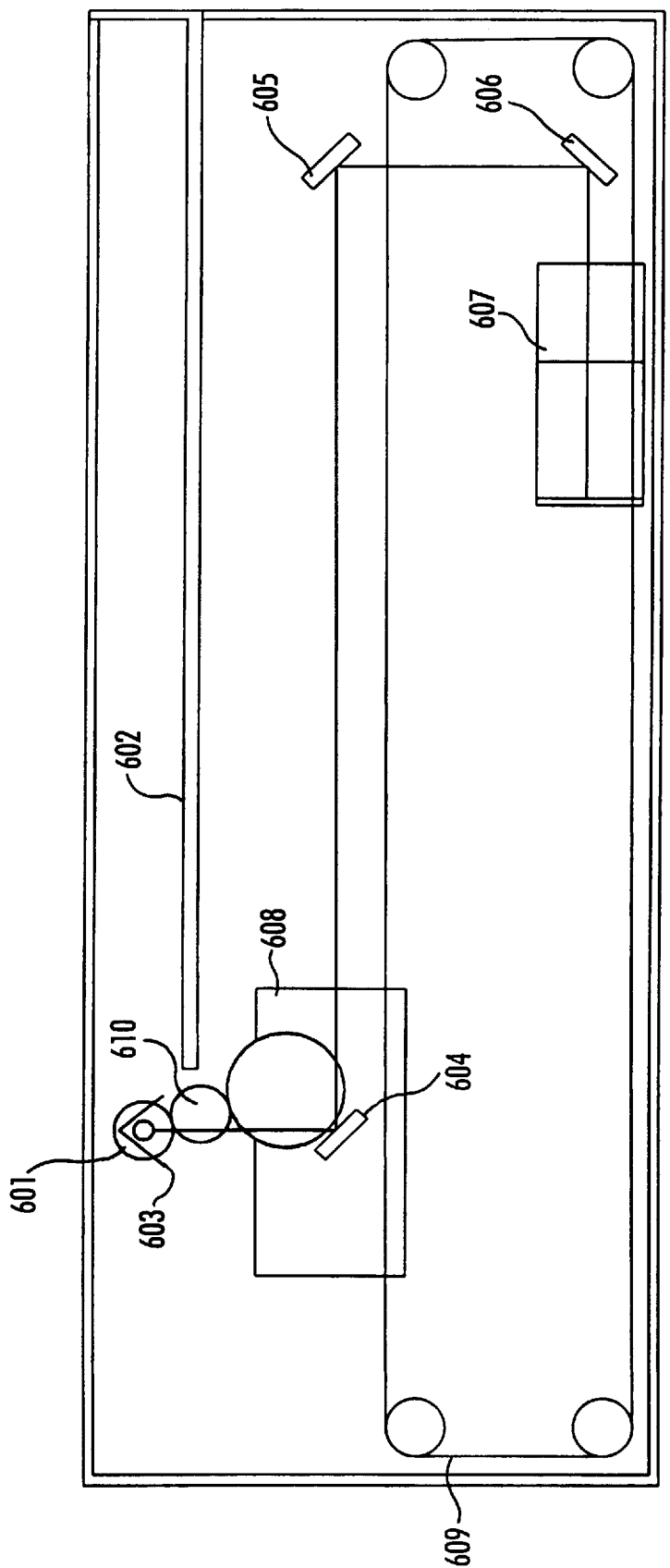
FIG. 3B is a sectional schematic view showing the invention is providing light source for a reflective sheet when the invention is coupled to a photo drive.

Refer to FIG. 3B, it shows the position of the rotatable lamp carriage when scanning a transparent sheet. To provide light source from top of the document tray, the lamp 601 of the rotatable lamp carriage 608 moves to the top of the transparent document tray 602. The conveying device 609 moves the rotatable lamp carriage 608 towards the document tray 602 and let the transparent document tray 602 pass through the space formed by the idle gear 610. The mirror 603 is moving right above the lamp 601 to reflect the light beams down to the transparent document tray 602. The light beams are then guided to the photoelectric converting unit 607 via an array of mirrors 604, 605, 606. The scanning job completes when each portion of the original sheet has been exposed.

The invention can also be adapted to a conventional scanner with a single conveying device as shown in FIG. 4. A conventional scanner implements all the optical members in a carriage. As FIG. 4 shows, each optical element is installed in the same carriage 701, including the rotatable lamp carriage 702, an array of mirrors 703, and a photoelectric conveying unit 704. When scanning, conveying device 705 moves the optical carriage 701 towards the document. The operation of scanning a reflective sheet and a transparent sheet for the implementation of FIG. 4 is similar to that of FIG. 3A and FIG. 3B. Please refer to the explanations above for details.

It should be understood that various alternatives to the structures described herein may be employed in practicing the present invention. It is intended that the following claims define the invention and that the structure within the scope of these claims and their equivalents be covered thereby.

What is claimed is:

1. An apparatus having a rotatable arm for providing light source for a transparent sheet and a reflective sheet comprising:

a lamp carriage for providing light source;

a base carriage;

a rotatable arm having one end mounted on one side of said base carriage and the other end connecting to one side of said lamp carriage for controlling the movement of said lamp carriage;

a support arm having one end mounted on the other side of said base carriage and the other end connecting to the other side of said lamp carriage parallel to said rotatable arm for supporting said lamp carriage;

driving means housing inside said base carriage for driving said rotatable arm; and when said rotatable arm is driven upwards, said lamp carriage provides light source for a transparent sheet; and when said rotatable arm is driven downwards, said lamp carriage provides light source for a reflective sheet.

2. The apparatus as claimed in claim 1, wherein said lamp carriage comprising:

a straight-tube fluorescent lamp; and reflecting means for reflecting the light rays emitting from said straight-tube fluorescent lamp to a desired direction.

3. The apparatus as claimed in claim 1, wherein said rotatable arm comprising:

a master gear connecting to said driving means for rotation;

a carriage gear connecting to said master gear for being driven by said master gear;

an idle gear connecting to said carriage gear for being driven by said carriage gear;

a holder gear connecting to one end of said lamp carriage and also to said idle gear for controlling the rotation of said lamp carriage; and a linkage plate connecting to said master gear, said carriage gear, said idle gear and said holder gear for holding said gears together.

4. An information reading apparatus for reading information from a reflective sheet and a transparent sheet using a single lamp comprising:

a transparent document tray for locating an original sheet;

a rotatable lamp carriage mounted on first support means for emitting light rays on said original sheet;

photoelectric converting means mounted on second support means and disposed below said transparent document tray for converting said light rays into electric signals; and driving means for driving said rotatable lamp carriage in a first direction and said photoelectric converting means in a second direction in synchronism and at the same speed.

5. The apparatus as claimed in claim 4, wherein said rotatable lamp carriage comprising:

a lamp carriage having a base carriage for providing light source;

a rotatable arm having one end mounted on one side of said base carriage and the other end connecting to one side of said lamp carriage for controlling the movement of said lamp carriage;

a support arm having one end mounted on the other side of said base carriage and the other end connecting to the other side of said lamp carriage parallel to said rotatable arm for supporting said lamp carriage;

driving means housing inside said base carriage for driving said rotatable arm; and when said rotatable arm is driven upwards, said lamp carriage provides light source for a transparent sheet; and when said rotatable arm is driven downwards, said lamp carriage provides light source for a reflective sheet.

6. The apparatus as claimed in claim 5, wherein said lamp carriage comprising:

a straight-tube fluorescent lamp; and reflecting means for reflecting the light rays emitting from said straight-tube fluorescent lamp to a desired direction.

7. The apparatus as claimed in claim 5, wherein said rotatable arm comprising:

a master gear connecting to said driving means for rotation;

a carriage gear connecting to said master gear for being driven by said master gear;

an idle gear connecting to said carriage gear for being driven by said carriage gear;

a holder gear connecting to one end of said lamp carriage and also to said idle gear for controlling the rotation of said lamp carriage; and a linkage plate connecting to said master gear, said carriage gear, said idle gear and said holder gear for holding said gears together.

8. The apparatus as claimed in claim 4 further comprising:

a plurality of mirrors located at proper locations for guiding said light rays into said photoelectric converting means.

9. The apparatus as claimed in claim 4, wherein said photoelectric converting means is a CCD line image sensor.

10. The apparatus as claimed in claim 4, wherein said photoelectric converting means is a CIS line image sensor.

* * * * *